US012675516B2

(12) United States Patent
Yamada

(10) Patent No.: US 12,675,516 B2
(45) Date of Patent: Jul. 7, 2026

(54) SERVER TRANSMITTING FONT DATA TO INFORMATION PROCESSING DEVICE AND METHOD OF TRANSMITTING FONT DATA BY SERVER

(71) Applicant: BROTHER KOGYO KABUSHIKI KAISHA, Nagoya (JP)

(72) Inventor: Jun Yamada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/090,068

(22) Filed: Mar. 25, 2025

(65) Prior Publication Data

US 2025/0307295 A1 Oct. 2, 2025

(30) Foreign Application Priority Data

Mar. 28, 2024 (JP) ................................ 2024-053992

(51) Int. Cl.

*G06F 16/338* (2019.01)
*G06F 40/109* (2020.01)
*G06F 40/263* (2020.01)

(52) U.S. Cl.

CPC .......... *G06F 16/338* (2019.01); *G06F 40/109* (2020.01); *G06F 40/263* (2020.01)

(58) Field of Classification Search

CPC ..... G06F 16/338; G06F 40/109; G06F 40/263
See application file for complete search history.

(56) References Cited

U.S. PATENT DOCUMENTS

| | | | | |
|---|---|---|---|---|
| 11,537,262 | B1 * | 12/2022 | Kaasila | G06F 3/0482 |
| 2003/0174177 | A1 | 9/2003 | Tsukuda et al. | |
| 2011/0289407 | A1 * | 11/2011 | Naik | G06F 40/109 715/269 |
| 2020/0151442 | A1 * | 5/2020 | Singh | G06V 10/82 |
| 2021/0073340 | A1 * | 3/2021 | Agarwal | G06V 30/40 |
| 2021/0103632 | A1 * | 4/2021 | Kadia | G06V 10/764 |
| 2021/0141464 | A1 * | 5/2021 | Jain | G06F 3/0236 |
| 2022/0067461 | A1 * | 3/2022 | Ampanavos | G06V 10/40 |
| 2024/0143897 | A1 * | 5/2024 | Kumar | G06F 40/109 |
| 2025/0068829 | A1 * | 2/2025 | Brdiczka | G06F 40/109 |

FOREIGN PATENT DOCUMENTS

| | | | |
|---|---|---|---|
| JP | 2002-099746 A | 4/2002 | |
| WO | WO-2004019249 A1 * | 3/2004 | G06Q 99/00 |

* cited by examiner

*Primary Examiner* — Tyler J Torgrimson
(74) *Attorney, Agent, or Firm* — Kenealy Vaidya LLP

(57) ABSTRACT

A set of computer-readable instructions, when executing by a computer of a server, causes the server to perform: when a font suggestion request is received from an information processing device and a user has been identified: a determination process; and a suggestion process. The determination process includes: extracting one or more related sets of label data related to the user from among a plurality of sets of label data recorded in a label database; and determining one or more languages based on one or more text objects contained in the one or more related sets of label data. The suggestion process includes: extracting one or more recommended sets of font data supporting the one or more languages from among a plurality of sets of font data recorded in a font database; and suggesting the one or more recommended sets of font data to the information processing device.

20 Claims, 11 Drawing Sheets

| 51 USER ID | 52 USERNAME | 53 PASSWORD | 54 FULL NAME | 55 ADDRESS | 56 PURCHASE INFORMATION | 57 ACCUMULATED POINTS |
|---|---|---|---|---|---|---|
| aaa1 | USER A | jjj1 | HANAKO YAMADA | ***** | fff1 | 150 |
| aaa2 | USER B | jjj2 | ICHIRO SUZUKI | ***** | fff2 cnt20 | 300 |

| LABEL ID (61) | USER ID (CREATOR USER) (62) | LABEL DATA (63) | SUPPLEMENTAL LABEL INFORMATION (64) | LABEL DATA SUBMISSION DATE (65) |
|---|---|---|---|---|
| ddd1 | aaa1 | LABEL DATA A | ...... | XXXX |
| ddd2 | aaa3 | LABEL DATA B | ...... | XXXX |

| 71 | 72 | 73 | 74 | 75 | 76 | 77 | 78 |
|---|---|---|---|---|---|---|---|
| FONT ID | FONT NAME | FONT DATA | FONT TYPE | COMPILED CHARACTER SET | SUPPORTED LANGUAGES | SUPPLEMENTAL FONT INFORMATION | FONT SUBMISSION DATE |
| fff1 | FONT NAME A | FONT FILE 1 | JAPANESE FONT | HIRAGANA<br>KATAKANA<br>JIS LEVEL 1 KANJI<br>JIS LEVEL 2 KANJI<br>GREEK CHARACTERS<br>......... | JAPANESE | FONT INTRODUCTORY TEXT: ............<br>..........<br>DESIGNER: XX | XXXX |
| fff2 | FONT NAME B | FONT FILE 2 | MULTILINGUAL FONT | ............<br>............<br>...........<br>........... | CHINESE<br>JAPANESE<br>KOREAN | FONT INTRODUCTORY TEXT: ............<br>..........<br>DESIGNER: YY | XXXX |

ART

Submitted Labels   Point Content

View All

FONT   (Recommended Fonts) View All

美しい国   美麗的國家

Font Name A   Font Name B

FONT

Submitted Labels   Point Content

View All

美しい国

Supported Language:
Japanese

Font Name F

이름다운 나라

Supported Language:
Korean

Font Name Z 300
323
322

312
321

330
331

400
401
404
402
401
404
402

SERVER TRANSMITTING FONT DATA TO INFORMATION PROCESSING DEVICE AND METHOD OF TRANSMITTING FONT DATA BY SERVER

REFERENCE TO RELATED APPLICATIONS

This application claims priority from Japanese Patent Application No. 2024-053992 filed on Mar. 28, 2024. The entire content of the priority application is incorporated herein by reference.

BACKGROUND ART

A conventional system for making content data available over the Internet is known in the art. The system includes a server for storing content data submitted by users. In other words, users upload content data from their devices to the server, and other users can download this content data to their own devices.

A system such as that described above is disclosed in Japanese Patent Application Publication No. 2002-099746, for example. In the point management system disclosed in Japanese Patent Application Publication No. 2002-099746, User A uploads photo data from a PC to a web server, and User B purchases and downloads that photo data from the web server to a personal computer (PC). When User B purchases and downloads the photo data, points corresponding to the purchase amount are added to the points for the purchasing user, User B in this case, while points corresponding to the data size of the photo data are also added to the points for the submission user, User A in this case, either when User A uploads the photo data or when User B downloads the photo data.

SUMMARY

In recent years, systems have been developed to facilitate the use of label data as content data for use in printing labels on label printers. In addition to providing label data, such systems often offer various font data that can be used with the label data, allowing for greater variation in label designs. However, the fonts represented by the font data typically support only a limited number of languages rather than all languages. Accordingly, there is a need for a mechanism that can suggest suitable fonts for individual users.

In order to attain the above and other objects, according to one aspect, the present disclosure provides a non-transitory computer-readable storage medium storing a set of computer-readable instructions for a server. The server includes a computer. The server is configured to access a label database and a font database. The set of computer-readable instructions, when executed by the computer, causes the server to perform: when a download request in which a set of font data is specified from among a plurality of sets of font data recorded in the font database is received from a download requesting device: a transmission process; and when a font suggestion request is received from a suggestion requesting device and a user of the suggestion requesting device has been identified as a suggestion requesting user: a determination process; and a suggestion process. The transmission process includes: transmitting. The transmitting in the transmission process transmits the set of font data specified in the download request to the download requesting device. The determination process incudes: extracting; and determining. The extracting in the determination process extracts one or more related sets of label data from among a plurality of sets of label data recorded in the label database. Each of the one or more related sets of label data is related to the suggestion requesting user. The determining in the determination process determines one or more languages based on one or more text objects contained in the one or more related sets of label data. The suggestion process includes: extracting; and suggesting. The extracting in the suggestion process extracts one or more recommended sets of font data from among the plurality of sets of font data recorded in the font database. Each of the one or more recommended sets of font data supports one or more of the one or more languages determined in the determination process. The suggesting suggests the one or more recommended sets of font data to the suggestion requesting device.

According to the set of computer-readable instructions having the above configuration, one or more related sets of label data related to the identified user are extracted from among the plurality of sets of label data recorded in the label database, and a language is determined based on text objects included in the one or more extracted related sets of label data. Subsequently, one or more recommended sets of font data supporting the determined language are suggested from among the plurality of sets of font data recoded in the font database. Accordingly, the set of computer-readable instructions facilitates the suggestion of fonts suitable for the user.

A server, system, device, control method, and a computer-readable storage medium storing the set of computer-readable instructions for implementing the functions of the above set of computer-readable instructions are also novel and useful.

According to another aspect, the present disclosure also provides a server communicable with an information processing device via a network. The server is configured to access a label database and a font database. The server is configured to perform: when a download request in which a set of font data is specified from among a plurality of sets of font data recorded in the font database is received from the information processing device: a transmission process; and when a font suggestion request is received from the information processing device and a user of the information processing device has been identified as an identified user: a determination process; and a suggestion process. The transmission process includes: transmitting. The transmitting in the transmission process transmits the set of font data specified in the download request to the download requesting device. The determination process includes: extracting; and determining. The extracting in the determination process extracts one or more related sets of label data from among a plurality of sets of label data recorded in the label database. Each of the one or more related sets of label data is related to the identified user. The determining in the determination process determines one or more languages based on one or more text objects contained in the one or more related sets of label data. The suggestion process includes: extracting; and suggesting. The extracting in the suggestion process extracts one or more recommended sets of font data from among the plurality of sets of font data recorded in the font database. Each of the one or more recommended sets of font data supports one or more of the one or more languages determined in the determination process. The suggesting in the suggestion process suggests the one or more recommended sets of font data to the information processing device.

According to still another aspect, the present disclosure further provides a method of transmitting font data by a server. The server is configured to access a label database and a font database. The label database stores therein a plurality of sets of label data. The font database stores therein a plurality of sets of font data. The method includes: in a case where the server receives, from a first client device, a download request in which font data is specified: transmitting. The transmitting transmits the font data specified in the download request to the first client device. The method further includes: in a case where the server receives, from a second client device, a font suggestion request and user identifying information identifying a user of the second client device: retrieving; determining; generating; and transmitting. The retrieving retrieves related label data from the label database. The related label data being related to the user identified by the user identifying information received together with the font suggestion request. The determining determines a language based on a text object contained in the related label data. The generating generates a list of recommended font data selected from among the plurality of sets of font data stored in the font database. The recommended font data supports the language determined based on the text object contained in the related label data. The transmitting transmits the list of the recommended font data to the second client device.

According to the technology disclosed in the present specification, a system for utilizing label data can be realized that is capable of suggesting suitable fonts for individual users.

BRIEF DESCRIPTION OF DRAWINGS

FIG. 2 is a diagram illustrating an example of a user database included in the label data sharing system.

FIG. 3 is a diagram illustrating an example of a label database included in the label data sharing system.

FIG. 4 is a diagram illustrating an example of a font database included in the label data sharing system.

DESCRIPTION

Embodiments of a set of computer-readable instructions used for sharing label data will be described in detail while referring to the accompanying drawings. These embodiments describe a set of computer-readable instructions that is installed on a server communicable with information processing devices via a network.

First Embodiment

Figure 1:
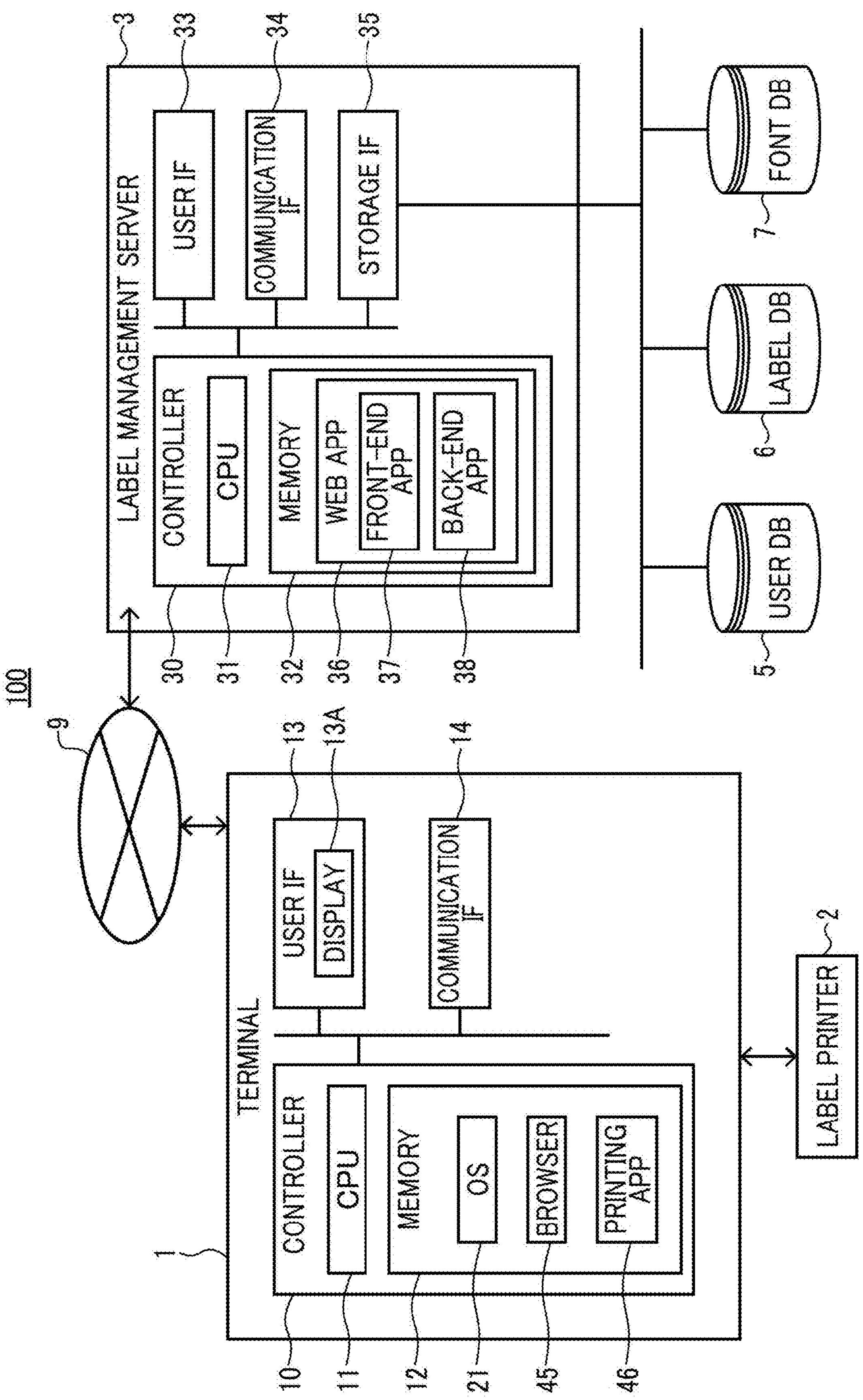
FIG. 1 is an explanatory diagram schematically illustrating a label data sharing system.

FIG. 1 illustrates a label data sharing system 100 (hereinafter simply called the "system 100") according to a first embodiment. The system 100 is provided by the vendor of label printers, for example. The system 100 includes a label management server 3, and a terminal 1. The label management server 3 and terminal 1 are connected via an internet 9. The terminal 1 is also connected to a label printer 2. The label management server 3 is an example of the server of the present disclosure. The terminal 1 is an example of the download requesting device, suggestion requesting device, upload instructing device, view requesting device, image processing device, first client device, second client device, and third client device of the present disclosure. The internet 9 is an example of the network of the present disclosure.

Although FIG. 1 shows only one terminal 1 connected to the label management server 3, in actuality many terminals 1 are connected to the label management server 3. The label printer 2 may also be connected to multiple terminals. Furthermore, the terminal 1 may be used by a plurality of users.

The label printer 2 is a device having at least a printing function and a communication function. The label printer 2 is connected to the terminal 1 through a wireless LAN communication technology such as Wi-Fi (registered trademark) or a short-range wireless technology such as Bluetooth (registered trademark). "Wi-Fi" is a registered trademark of Wi-Fi Alliance. "Bluetooth" is a registered trademark of Bluetooth SIG, Inc. Communication between the label printer 2 and terminal 1 may also be configured through a wired connection according to the Universal Serial Bus (USB) communication standard.

The types of tape that can be mounted in the label printer 2 are predetermined for each model of label printer 2, for example. Upon receiving a print job including label data, the label printer 2 executes printing based on the label data while conveying the tape mounted therein. Subsequently, the label printer 2 discharges the printed portion of the tape from the device, thereby creating a label of a prescribed size.

The terminal 1 is an information processing device used by the owner or user of the label printer 2 (hereinafter referred to as the "user"). The terminal 1 may be a smartphone, tablet device, or personal computer (PC), for example. The terminal 1 includes a controller 10 that includes a CPU 11 and a memory 12. The terminal 1 also includes a user interface (also referred to as the "user IF") 13 and a communication interface (also referred to as the "communication IF") 14, both of which are connected to the controller 10.

The label management server 3 is provided by the vendor of the label printer 2. In this embodiment, the label management server 3 includes a controller 30 that includes a CPU 31 and a memory 32. The CPU 31 is an example of the computer of the present disclosure. The label management server 3 also includes a user interface (also referred to as the "user IF") 33, a communication interface (also referred to as the "communication IF") 34, and a storage interface (also referred to as the "storage IF") 35, all of which are connected to the controller 30.

Note that the controller 10 and controller 30 in FIG. 1 are each a general concept that covers hardware and software used for controlling the terminal 1 or label management server 3 and are not actually limited to representing a single piece of hardware present in the terminal 1 or label management server 3.

The CPU 11 in the terminal 1 and the CPU 31 in the label management server 3 each execute various processes according to programs read from the memory 12 of the terminal 1 and the memory 32 of the label management server 3, respectively, and based on user operations. Each of the memory 12 and memory 32 stores various programs and various data. The memory 12 and memory 32 are also used as work areas when executing various processes. Buffers provided in the CPU 11 and CPU 31 are also examples of memory. Examples of the memory 12 and memory 32 may be ROM, RAM, a hard disk drive, or the like built into the terminal 1 or label management server 3, or may be any storage medium that is readable and writable by the CPU 11 and CPU 31, such as CD-ROM or DVD-ROM.

The user interface 13 and user interface 33 each include hardware that displays screens for reporting information to the user, and hardware that receives user operations. The user interface 13 includes a display 13*a* for displaying information, for example. The user interface 13 and user interface 33 may also each be a set of devices including a display capable of displaying information and a mouse, keyboard, and the like with input-receiving functions. Alternatively, the user interface 13 and user interface 33 may be touchscreens having both a display function and an input-receiving function.

The communication interface 14 and communication interface 34 each include hardware for communicating with external devices. The terminal 1 and label management server 3 are connected to the internet 9 via their respective communication interface 14 and communication interface 34 so as to be capable of communicating with each other. The terminal 1 is configured to be connected to the label printer 2 via the communication interface 14. The communication standard employed by the communication interfaces 14 and 34 may be Ethernet (registered trademark), Wi-Fi (registered trademark), Universal Serial Bus (USB), or the like. "Ethernet" is a Japanese trademark of FUJIFILM Business Innovation Corp. Alternatively, the terminal 1 and label management server 3 may each include a plurality of respective communication interfaces 14 and communication interfaces 34 supporting a plurality of communication standards.

The memory 12 of the terminal 1 stores various data and various programs including an operating system (hereinafter abbreviated as "OS") 21, a browser 45, and a printing application program (hereinafter called a "printing app") 46. The browser 45 and printing app 46 are also referred to as "client apps."

The OS 21 is a multitasking OS configured to process a plurality of tasks in parallel by switching between tasks. The OS 21 may be one of Windows (registered trademark), macOS (registered trademark), Linux (registered trademark), iOS (registered trademark), and Android (registered trademark), for example. "Windows" is a registered trademark of Microsoft Corporation. "macOS" is a registered trademark of Apple Inc. "Linux" is a registered trademark of Linus Torvalds. "iOS" is a registered trademark of Cisco Technology, Inc. "Android" is a registered trademark of Google LLC.

The browser 45 is a program used for viewing web sites. The browser 45 is started up by the user using the terminal 1. The browser 45 has a function for displaying a web page on the display 13*a* upon startup. The web page is provided by a web server (the label management server 3, for example) and the location of the web page is specified by a URL provided by the web server. The browser 45 may be supplied by the vendor of the OS 21 and incorporated into the OS 21 or may be installed on the terminal 1 separately from the OS 21, for example.

The printing app 46 is an application program provided by the vendor of the label printer 2. The printing app 46 has a function for transmitting a print job including label data to the label printer 2 to have the label printer 2 execute printing based on the label data. The label printer 2 used to execute printing may be pre-registered in the printing app 46 or may be selected by the user when the user configures print settings. The printing app 46 may also have functions for generating and editing label data on the terminal 1.

The memory 32 of the label management server 3 stores various data and various programs including a web application program (hereinafter called a "web app") 36. The web app 36 is not installed on the terminal 1 but can be used in a browser of the terminal 1. The web app 36 is an example of the set of computer-readable instructions of the present disclosure.

The terminal 1 uses the browser 45 or a browser function of the printing app 46 to access the web app 36 in the label management server 3 in order to utilize services provided by the web app 36. For example, the web app 36 is configured to provide a service to logged-in users for recording label data uploaded, i.e., submitted, from the terminal 1 (hereinafter also referred to as "submitted label data") on the label management server 3 and a service for downloading recorded label data from the label management server 3 to the terminal 1.

In the present embodiment, the web app 36 includes a front-end app 37, and a back-end app 38. The front-end app 37 and the back-end app 38 may also be stored on separate servers.

The front-end app 37 has a web server function, for example. The front-end app 37 can be accessed directly from the terminal 1. Various page information for displaying screens on the terminal 1 are prepared in the front-end app 37.

The back-end app 38 has different functions from the web server function. Fundamentally, the back-end app 38 cannot be accessed directly from the terminal 1. For example, the back-end app 38 is configured to call a user database (also referred to as the "user DB") 5, a label database (also referred to as the "label DB") 6, or a font database (also referred to as the "font DB") 7 via the storage interface 35 to record (i.e., store) and retrieve information.

As illustrated in FIG. 2, the user database 5 is configured to record therein user information on users who are authorized to access the services provided by the system 100. A record containing a user ID field 51, a username field 52, a password field 53, a full name field 54, an address field 55, a purchase information field 56, and an accumulated points field 57 is generated in the user database 5 for each user.

The user ID field 51 records therein information for identifying the user. The username field 52, password field 53, full name field 54, and address field 55 record therein the respective username, password, full name, and address entered by the user during registration, which are used when utilizing the system 100. The user database 5 may also record therein personal information other than the user's full name and address, such as an email address, postal code, and telephone number. The purchase information field 56 records therein information specifying any content the user has purchased and downloaded to the terminal 1, for example. Examples of content are fonts, emojis, images, and functions. The accumulated points field 57 records therein the number of points earned by the user. Points can be used to purchase various products, such as content and consumables. The purchase information may also be recorded in a separate database from the user database 5 in association with the user ID.

As shown in FIG. 3, the label database 6 records therein information on label data that can be provided to users. Label data recorded in the label database 6 may be data that the vendor of the label printer 2 has prepared in advance or submitted label data submitted by users of the label management server 3. A record containing a label ID field 61, a user ID (Creator User) field 62, a label data field 63, a supplemental label information field 64, and a label data submission date field 65 is generated in the label database 6 for each set of label data.

The label field ID 61 records therein information for identifying the label data. The user ID (Creator User) field 62 records therein the user ID of the user who has submitted the label data. When the label data is created by someone other than the user who has submitted the label data, the user ID (Creator User) field 62 may record therein the administrator's ID or may be left blank. The information recorded in the user ID (Creator User) field 62 is an example of the user information of the present disclosure.

The label data field 63 records therein label data that contains information configuring the label data, and the label data is stored in a prescribed storage format. For example, the label data corresponding to the label data field 63 is stored in the Extensible Markup Language (XML) format using the UCS Transformation Format 8 (UTF-8) encoding. The label data may be stored in various formats in addition to XML, such as Hypertext Markup Language (HTML), rich text, JavaScript Object Notation (JSON), and vendor-specific formats.

Examples of information configuring label data include information about objects configuring the label data and their placement, character strings, images, and the like. For example, information configuring label data that contains text objects includes text and font attributes. Examples of font attributes are the font name, font ID, and character codes. A character code is a unique number assigned to each individual character, symbol, and the like, enabling computers to handle such characters, symbols, and the like. Character encoding is not limited to that in UTF-8 but may be specified in XML tags together with the language setting. The specified character encoding may be Shift-JIS or GB 18030, for example.

The supplemental label information field 64 records therein information received in a submission screen for submitting label data. For example, the supplemental label information 64 includes a label name, a category, and an image showing a sample use of the label. The label data submission date field 65 records therein information indicating the date that the label data was submitted.

As illustrated in FIG. 4, the font database field 7 records therein information on font data that can be provided to the user. Common fonts are prestored in the printing app 46 installed on the terminal 1, for example. However, the variety of fonts can impact the quality of a label. For this reason, the ability to use custom fonts in addition to the common fonts when creating or editing label data with the printing app 46 can increase the variety of possible label designs. By providing the label management server 3 with the font database 7, font data prepared by the vendor of the label printer 2 and font data submitted by users can be recorded in the font database 7 for download.

A record containing a font ID field 71, a font name field 72, a font data field 73, a font data field 73, a font type field 74, a compiled character set field 75, a supported languages field 76, a supplemental font information field 77, and a font submission date field 78 is generated in the font database 7 for each set of font data.

The font ID field 71 records therein information for identifying the font data. The font name field 72 records therein the name that the user has inputted for the font when submitting the custom font. The font data field 73 records therein information configuring each character of the compiled set. Information configuring a character may be the line thickness and character color, for example. The font data field 73 also records therein character codes.

The font type field 74 records therein information specifying the type of font, such as a Japanese font, a European font, or a multilingual font supporting a plurality of languages. The compiled character set field 75 records therein the name of the character set compiled in the font data. Examples of character sets supporting Japanese are hiragana, katakana, JIS level 1 kanji, JIS level 2 kanji, and Greek characters. Note that the compiled character set field 75 need not include all character sets of the supported language. For example, the compiled character set field 75 for a font supporting Japanese need not include JIS level 2 kanji.

The supported languages field 76 records therein information specifying the languages supported by the font data. The information recorded in the supported language field 76 may specify one or more languages as the supported languages. The supplemental font information field 77 records therein information inputted by the user when submitting the font data. The information recorded in the supplemental font information field 77 include font introductory text describing the font, and the name or designation of the designer who has designed the font, for example. The font submission date field 78 records therein information specifying the date that the font data was submitted.

Next, operational procedures executed by the system 100 of the present embodiment will be described with reference to the drawings. In the present embodiment, each process step other than a user operation essentially indicates a process performed by the CPU 11 and CPU 31 according to instructions in the printing app 46, front-end app 37, back-end app 38, and other programs. In this specification, the various processes performed by the controller 10 and controller 30 or CPU 11 and CPU 31 in accordance with the OS 21, browser 45, printing app 46, front-end app 37, back-end app 38, and other programs may be described as the programs themselves performing the processes for the sake of convenience. Processing by the CPU 11 and CPU 31 includes hardware control using the application program interface (API) of the OS. This specification omits a detailed description of the OS while describing operations of each program. Further, the terms "obtain" and "retrieve" are used as a concept that does not necessarily require a request.

<Submission Process>

A submission process for submitting label data to the label management server 3 will be described with reference to FIG. 5. Here, a case in which User A (hereinafter called "Submission User A") submits label data will be described. To facilitate this description, the letter "A" will be appended to the reference numerals of the terminal 1 used by Submission User A and its components.

Figure 5:
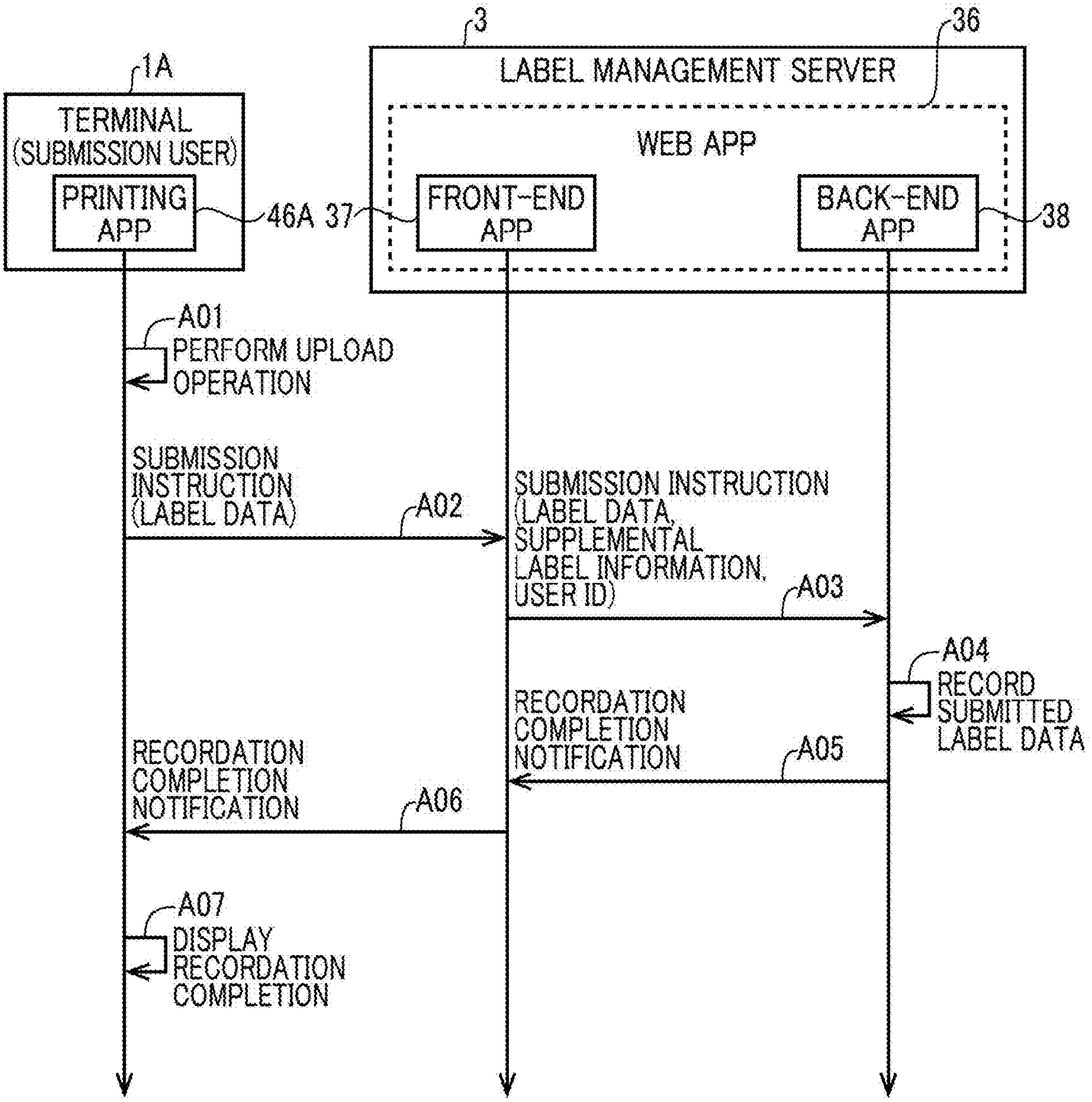
FIG. 5 is a sequence diagram illustrating an example of steps in a submission process executed in the label data sharing system.

In A01 of the example shown in FIG. 5, Submission User A starts up the printing app 46A and performs an upload operation on the terminal 1A. The printing app 46A accesses the label management server 3 using its own browser function. When the printing app 46A subsequently receives an operation on a Submit button, for example, the printing app 46A issues a request to the label management server 3 using the communication interface 14A requesting that the label management server 3 transmit a submission screen. Please note that, in this specification, the description of requesting, transmitting and receiving a specific screen or web page refers to requesting, transmitting and receiving data required to display the specific screen or web page. When Submission User A is properly logged in, the front-end app 37 provides the submission screen (not illustrated) to the printing app 46A enabling the printing app 46A to display the submission screen on the user interface 13A of the terminal 1A. In A02 the front-end app 37 receives a submission instruction from the terminal 1A when the printing app 46A receives a designation of label data to be submitted, inputted supplemental information, and an instruction to execute a new submission in the submission screen displayed on the terminal 1A, for example. The submission instruction received from the terminal 1A has the label data added thereto. The label data has been designated in the submission screen.

Upon receiving the submission instruction from the terminal 1A via the communication interface 34, in A03 the front-end app 37 transfers this submission instruction to the back-end app 38. At this time, the submission instruction has the label data, the supplemental screen, and the user ID of the logged-in Submission User A added thereto. The label data has been submitted from the terminal 1A, and the supplemental label information has been inputted into the submission screen. In A04 the back-end app 38 calls the label database 6 using the storage interface 35 and records the submitted label data submitted by Submission User A in the label database 6. The process of A04 is an example of the recording process of the present disclosure.

More specifically, the back-end app 38 generates a new label ID and stores a new record in the label database 6 containing this new label ID recorded in the label ID field 61, as illustrated in FIG. 3. Next, the back-end app 38 records the user ID, submitted label data, and supplemental label information added to the submission instruction in the corresponding user ID (Creator User) field 62, label data field 63, and supplemental label information field 64 of the record containing this new label ID recorded in the new label ID field 61. The back-end app 38 also records the submission date on which the submitted label data was submitted in the upload date field 65.

Once the label data has been recorded (i.e., stored), the back-end app 38 issues a "recordation completion" notification to the terminal 1A via the front-end app 37 in A05 and A06. Upon receiving this "recordation completion" notification, in A07 the terminal 1A displays a message indicating that the submitted label data has been recorded, thereby informing Submission User A that the submission is complete.

While the submission process is performed using the browser function of the printing app 46A in this embodiment, the terminal 1A may perform the submission process using the browser 45A. In this case, Submission User A logs in to the label management server 3 via the browser 45A and displays the submission screen in the browser 45A.

<Downloading and Printing Process>

A process for downloading and printing label data will be described with reference to FIGS. 6 and 7. This description will cover a case in which User B (hereinafter referred to as "Print User B") downloads submitted label data submitted by Submission User A and has a label printer execute printing based on this submitted label data. To facilitate this description, the letter "B" will be appended to the reference numerals for the terminal 1 used by Print User B and its components.

Figures 6A, 6B:
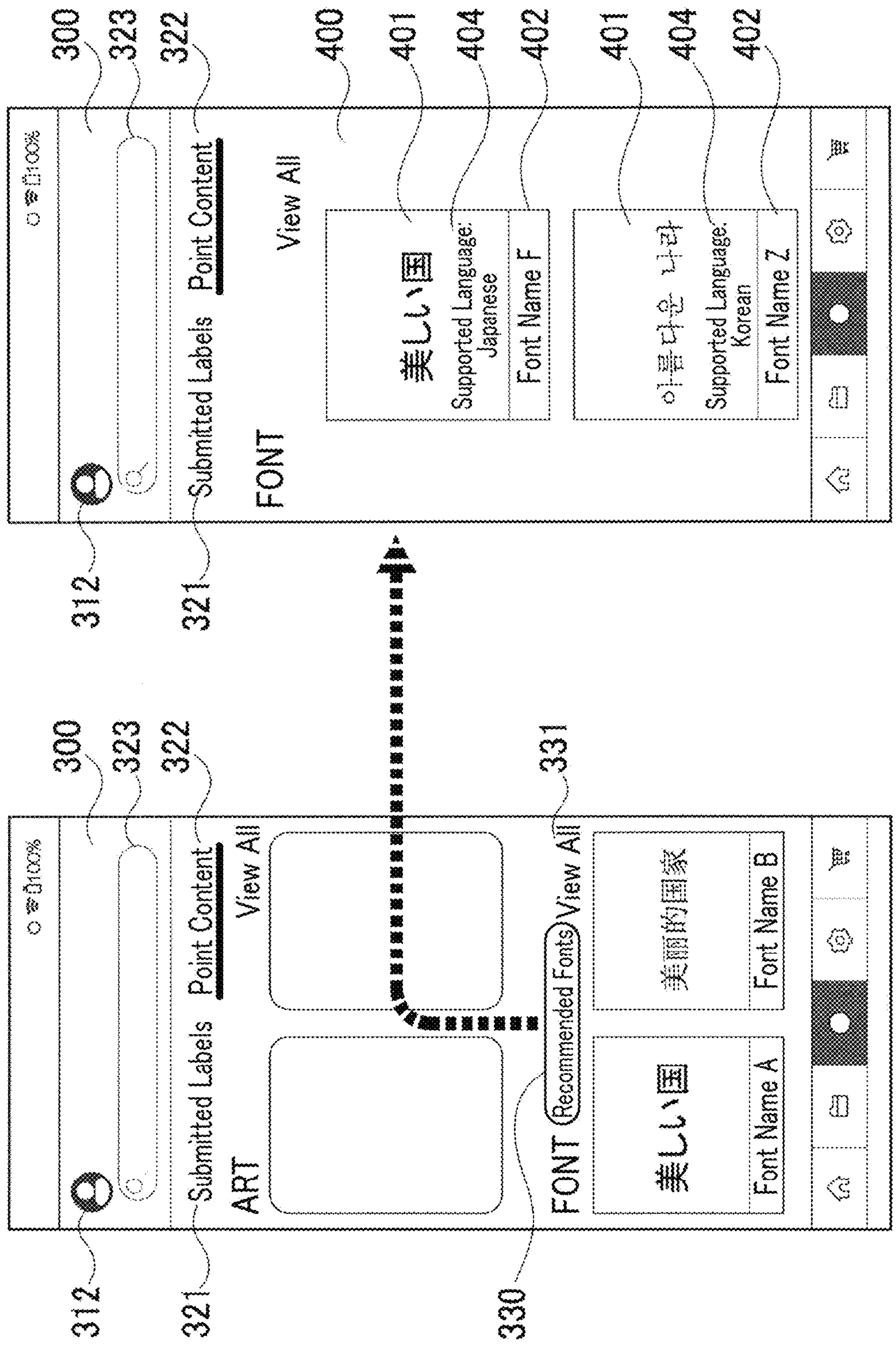
FIGS. 6A and 6B are diagrams illustrating an example of screen transitions in a terminal included in the label data sharing system.

When the printing app 46B of the terminal 1B connects to the label management server 3 using its own browser function, the printing app 46B displays a web page provided by the label management server 3 on the display 13*a*B. FIG. 6A illustrates an example of a web page 300. The web page 300 includes a login button 312, a submitted label display tab 321, a content display tab 322, and a label search field 323. When the submitted label display tab 321 is operated, the web page 300 is switched to a screen displaying based on label data registered on the label management server 3.

Figure 7:
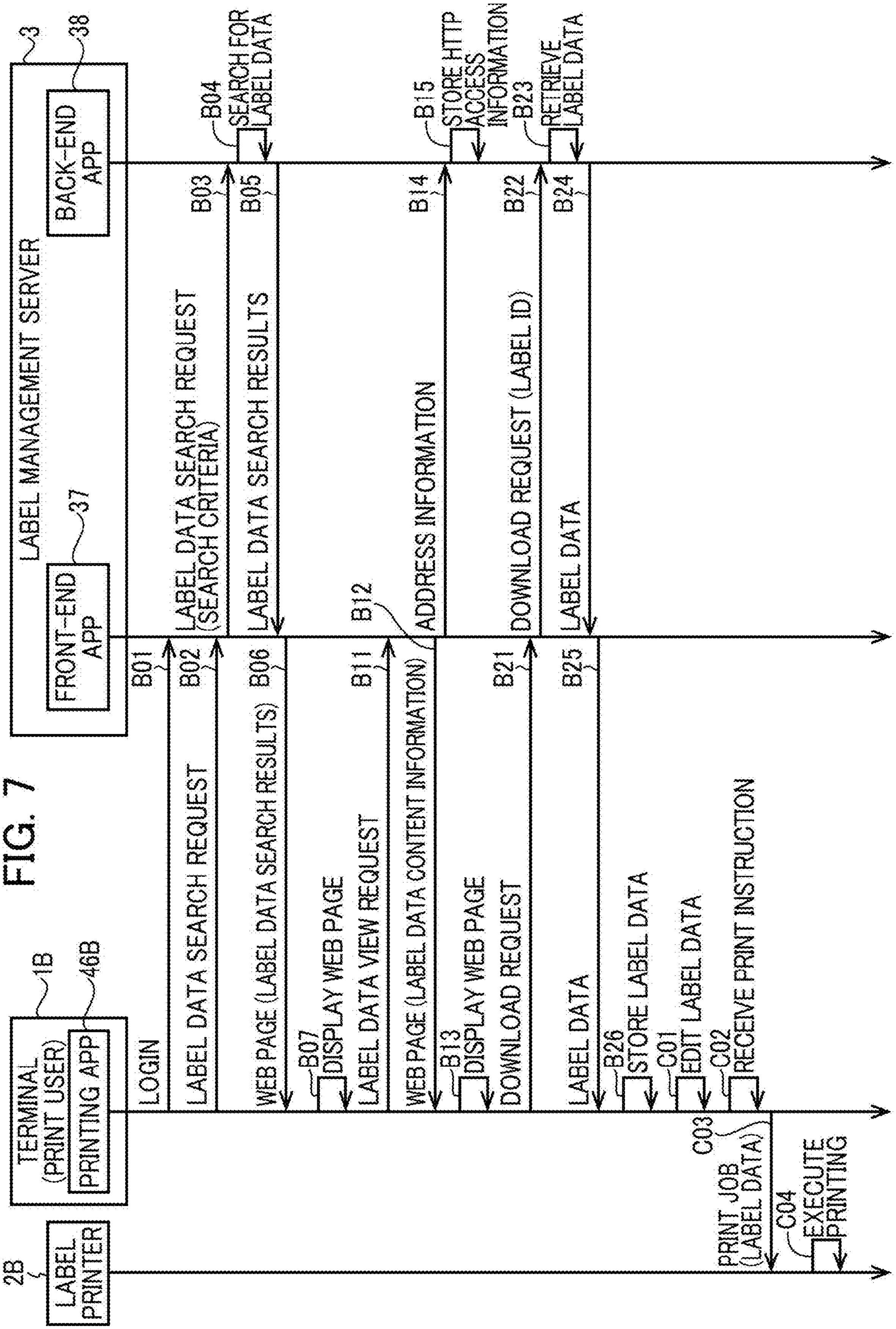
FIG. 7 is a sequence diagram illustrating an example of steps in a downloading and printing process executed in the label data sharing system.

As shown in the example of FIG. 7, in B01 Print User B operates the login button 312 to log in to the label management server 3. If the printing app 46B has previously stored login information, the printing app 46B may automatically log in to the label management server 3 using this stored login information when connecting to the label management server 3. Note that the timing for logging in is not limited to this example but may occur when a download is requested.

In this example, the Print User B next inputs label search criteria in the label search field 323 shown in FIG. 6A to execute a search. As a result, in B02 of FIG. 7 the front-end app 37 receives a label data search request from the terminal 1B and in B03 transfers this label data search request to the back-end app 38. The label data search request has the search criteria which has been inputted into the label search field 323 added thereto.

In B04 the back-end app 38 accesses the label database 6 and searches for label data that matches the search criteria. In B05 the back-end app 38 transfers these search results to the front-end app 37. In B06 the front-end app 37 includes the search results in a web page and transmits the web page to the terminal 1B. In B07 the terminal 1B displays this web page.

In this example, the submitted label data (containing text objects) submitted by Submission User A matches the search criteria along with other label data and is displayed together with the other label data in a web page containing the search results. When Print User B selects on the terminal 1B the submitted label data submitted by Submission User A, in B11 the front-end app 37 receives a view request to view the submitted label data that has been selected (selected submitted label data). In B12 the front-end app 37 includes content information specifying the content of the selected label data in a web page and transmits the web page to the terminal 1B that is the source of the view request. In B13 the terminal 1B displays the web page on the display 13*a*B. The content information includes a sample image of the submitted label data, the label name, and the category, for example. The process of B11 through B13 is an example of the viewing process of the present disclosure.

In B14 the front-end app 37 transfers address information specifying the address of the viewed page to the back-end app 38. The address information may have the user ID of the logged-in Print User B and the label ID of the submitted label data that has been viewed (viewed submitted label data) added thereto, for example. In B15 the back-end app 38 stores HTTP access information associating the received address information, the user ID of Print User B, the label ID of the viewed submitted label data, and the view date and time with one another in a prescribed storage area. The prescribed storage area may be located either inside or outside the label management server 3. This process leaves a view history indicating that Print User B has viewed the label data submitted by Submission User A. The view history for label data prepared by someone other than a user, such as the vendor of the label printer 2, is similarly preserved.

When a download button is operated on the terminal 1B while the submitted label data from Submission User A is selected, in B21 the front-end app 37 receives a download request from the terminal 1B to download the selected submitted label data. In B22 the front-end app 37 transfers the received download request to the back-end app 38. The download request has the label ID of the selected submitted label data added thereto.

In B23 the back-end app 38 calls the label database 6 and retrieves the submitted label data submitted by Submission User A based on the label ID added to the download request. In B24 the back-end app 38 transfers this submitted label data to the front-end app 37. In B25 the front-end app 37 transmits the submitted label data submitted by Submission User A to the terminal 1B, which is the source of the download request, via the communication interface 34. When the terminal 1B receives the submitted label data via the communication interface 14B, in B26 the terminal 1B stores this submitted label data in a storage area of the memory 12B allocated for the printing app 46B.

Subsequently, in C01 the printing app 46B can display an image based on the label data downloaded to the terminal 1B in an editing screen for editing the label data and can receive editing operations. When the printing app 46B receives a print instruction in C02, in C03 the printing app 46B transmits a print job containing the edited label data to the selected label printer 2. In C04 the label printer 2 executes printing based on the print job. The printing app 46B need not receive the print instruction via the editing screen but may receive the print instruction in another manner. For example, the printing app 46B may display a screen on the terminal 1B containing a list of labels whose label data is stored on the terminal 1B and through this screen may receive a selection of label data to be printed and a print instruction.

<Content Downloading Process>

Figure 8:
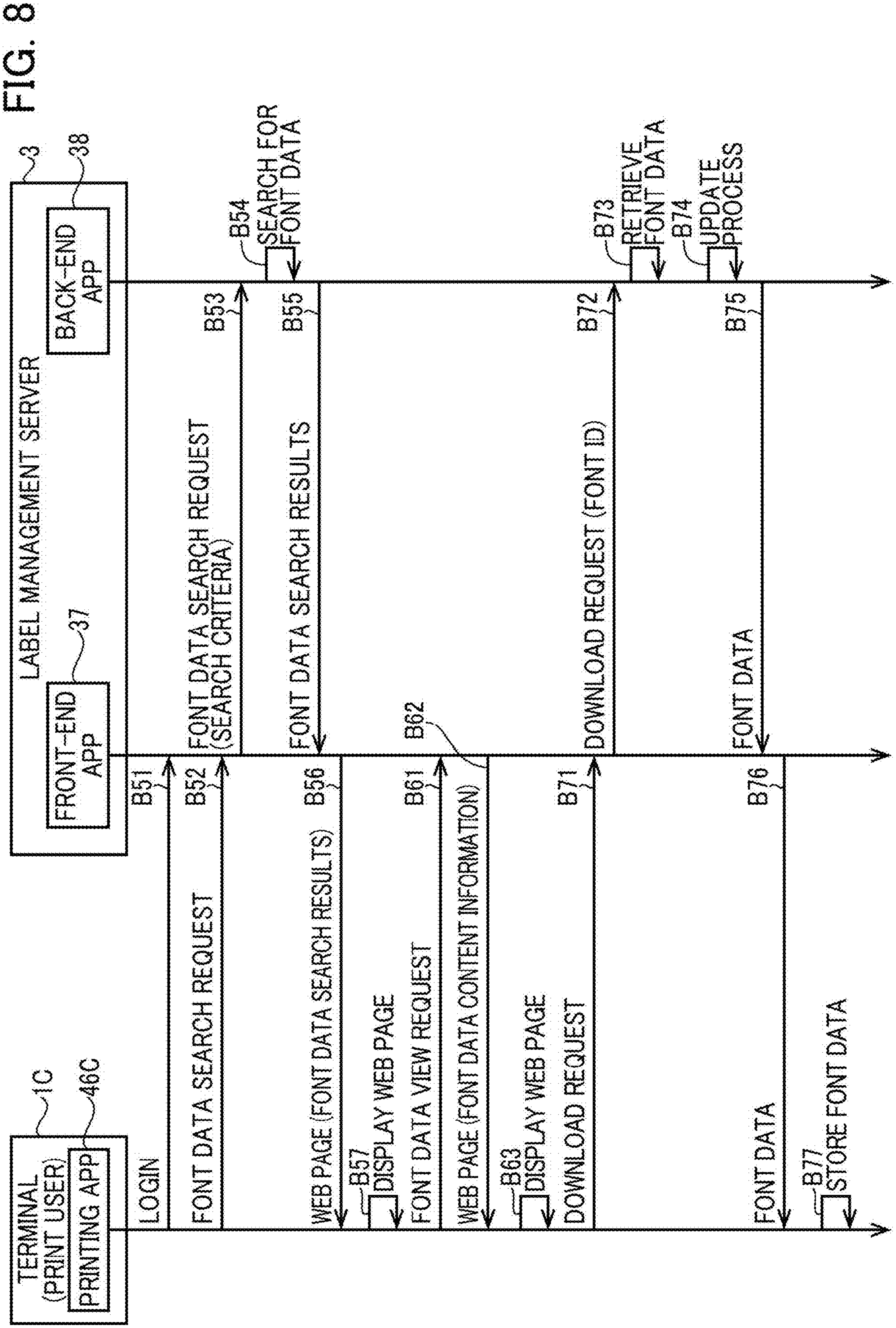
FIG. 8 is a sequence diagram illustrating an example of steps in a content downloading process executed in the label data sharing system.

A content downloading process for downloading content to the terminal 1 from the label management server 3 will be described with reference to FIG. 8. When a text object included in submitted label data which has been downloaded (downloaded submitted label data) uses a font that has not yet been purchased, for example, printing based on the downloaded submitted label data cannot be executed. Furthermore, label data generated with the printing app 46 can use fonts whose font data has been downloaded from the label management server 3 to expand the range of design variations. The following description covers a case in which Print User B downloads a font registered on the label management server 3.

This example will assume that the Print User B is logged in to the label management server 3 in B51. When the printing app 46B of the terminal 1B receives an operation on the content display tab 322 displayed in the web page 300, in B52 of FIG. 8 the front-end app 37 receives a font data search request from the terminal 1 to search for font data. In B53 the front-end app 37 transfers this font data search request to the back-end app 38. The font data search request has search criteria such as the order of most recent recordation added thereto.

In B54 the back-end app 38 calls the font database 7 to search for font data that matches the search criteria. In B55 the back-end app 38 transfers the search results to the front-end app 37. Search results include a list of fonts corresponding to font data retrieved in the search that matches the search criteria. In B56 the front-end app 37 includes the fonts search results in a web page and transmits the web page to the terminal 1B. In B57 the terminal 1B displays this web page.

When Print User B operates the terminal 1B to select a font corresponding to one set of font data matching the search criteria, in B61 the front-end app 37 receives a view request to view the selected font data. In B62 the front-end app 37 includes content information specifying content of the selected font data in a web page and transmits the web page to the terminal 1B, which is the source of the view request. In B63 the terminal 1B displays the web page on the display 13*a*B. The content information includes a sample image of the font and the font name, for example.

For example, a Download button is provided in the font viewing screen displaying content information for the selected font data. When this Download button is operated, in B71 the front-end app 37 receives a download request from the terminal 1B specifying the font data displayed in the font viewing screen. In B72 the front-end app 37 transfers the received download request to the back-end app 38. The download request has the font ID of the specified font data added thereto.

In B73 the back-end app 38 calls the font database 7 to retrieve font data corresponding to the font ID added to the download request. In B74 the back-end app 38 updates the user database 5 based on the retrieved font data. For example, when the retrieved font data requires payment, the back-end app 38 calls the user database 5 and includes the font ID of the retrieved font data into the purchase information recorded in the purchase information field 56 on the condition that Print User B pays the points required for the purchase from the accumulated points recorded in the accumulated points field 57 associated with the user ID of the logged-in user, i.e., Print User B. Alternatively, when the retrieved font data is free of charge, the back-end app 38 calls the user database 5 and includes the font ID of the retrieved font data into the purchase information recorded in the purchase information field 56 without adjusting the points for Print User B. The process of B74 is an example of the updating process of the present disclosure.

Subsequently, in B75 the back-end app 38 transfers the retrieved font data to the front-end app 37. In B76 the front-end app 37 transmits the font data via the communication interface 34 to the terminal 1B, which is the source of the download request. The process of B76 is an example of the transmission process of the present disclosure. After receiving the font data via the communication interface 14B, in B77 the terminal 1B stores this font data in the storage area of the memory 12 allocated for the printing app 46B.

After the back-end app 38 settles any payment for the content retrieved in B73, the back-end app 38 may transmit the retrieved content to the terminal 1B via the front-end app 37 in B75 and B76 and subsequently may include the content ID of the retrieved content into the purchase information recorded in the purchase information field 56 of the user database 5. In other words, the purchase information recorded in the purchase information field 56 may be updated after font data is transmitted to the terminal 1B.

By updating the purchase information recorded in the purchase information field 56 for the logged-in user when the user downloads font data to the terminal 1 in this way, the web app 36 can manage downloaded font data for each user based on the purchase information in the user database 5 without accessing the printing app 46.

<Recommended Fonts Suggestion Process>

A recommended fonts suggestion process for suggesting recommended fonts will be described with reference to FIG. 9. By downloading font data not stored in the printing app 46 from the label management server 3, the user can expand the selection range for fonts in order to generate label data with rich variations. For example, the system 100 allows users to submit label data with rich variations to the label management server 3 to promote the use of such label data.

However, many of the fonts represented by font data are limited in the languages they support and are unable to support all languages. It is practically impossible for general users to individually identify the supported languages of each set of font data registered on the label management server 3. Additionally, the languages used by users for label data are becoming increasingly diverse due to the need to support inbound tourism and other factors. On the other hand, submitted label data is actually created by logged-in users and, hence, the language used in the submitted label data is highly likely to be used again by the logged-in users when creating label data thereafter. Therefore, in the process to suggest recommended fonts in the present embodiment, when a font suggestion request is received, the label management server 3 determines the language used by the logged-in user based on the user's submission history and suggests fonts corresponding to font data supporting the determined language.

The following description covers a case of suggesting recommended fonts to User C (hereinafter referred to as "Recommendation Requesting User C"). To facilitate this description, the letter "C" is appended to reference numerals for the terminal 1 used by Recommendation Requesting User C and its components.

In this example, the browser 45C of the terminal 1C connects to the label management server 3 using the communication interface 14C and displays the web page 300 illustrated in FIG. 6A on the display 13*a*C. The terminal 1C may also use the browser function of the printing app 46C to display the web page 300. When the content display tab 322 is operated in the web page 300, the terminal 1C switches the screen to a screen displaying a list of content registered on the label management server 3. The content includes, for example, art, fonts, and functions that can be set for objects configuring the label data. Each content is displayed, for example, in order of most recent recordation.

The display area for fonts includes a Suggest Fonts button 330. The Suggest Fonts button 330 is a control element that receives an instruction to suggest fonts. When the terminal 1C receives an operation on the Suggest Fonts button 330, in E01 of FIG. 9 the front-end app 37 receives a font suggestion request from the terminal 1C.

Upon receiving a font suggestion request, in E11 the front-end app 37 determines whether the user can be identified. When Recommendation Requesting User C is not logged in to the label management server 3, for example, the front-end app 37 determines that the user cannot be identified (alt: unidentifiable). In this case, in E21 the front-end app 37 requests the back-end app 38 to transmit a list of popular fonts for label data.

Here, the back-end app 38 can reference HTTP access information stored in the predetermined storage area and count the number of times each set of font data has been accessed, for example. In E22 the back-end app 38 then identifies a prescribed number of fonts having the greatest number of access counts, beginning from the font with the greatest number, extracts font data for the identified fonts from the font database 7, and generates a popular fonts list. In E23 the back-end app 38 transfers the popular fonts list to the front-end app 37.

When the back-end app 38 is capable of storing, for example, the download history of label data and content in association with each user ID, label ID, font ID, and download date and time, the back-end app 38 may generate the popular fonts list based on the number of downloads.

In E24 the front-end app 37 includes the popular fonts list received from the back-end app 38 in a web page and transmits the web page to the terminal 1C, which is the source of the font suggestion request. In E25 the terminal 1C displays the popular fonts list in the browser 45C. At this time, the terminal 1C may display thumbnail images of the fonts arranged in order of popularity, for example.

Note that when the front-end app 37 cannot identify Recommendation Requesting User C, the front-end app 37 may request authentication by displaying an authentication screen in the browser 45C for prompting the user to log in. When the web app 36 is successful in authenticating the user based on the user ID and password inputted into the authentication screen and can identify Recommendation Requesting User C, then the web app 36 may advance to the process of E31 described below without executing steps E21 through E25. On the other hand, the web app 36 proceeds with the process in E21 through E25 when authentication fails since the web app 36 cannot identify Recommendation Requesting User C in this case.

When the terminal 1C is used by Recommendation Requesting User C and another user different from Recommendation Requesting User C, for example, the other user could attempt to use services provided by the web app 36 by impersonating Recommendation Requesting User C. Therefore, the web app 36 may always request login authentication when the Suggest Fonts button 330 is operated. The web app 36 may also transfer account information for a logged-in user to the printing app 46C when the user is browsing while logged in and may request login authentication for Recommendation Requesting User C when receiving a notification from the printing app 46C that the account information does not match the information set in the printing app 46C.

On the other hand, when Recommendation Requesting User C is logged in to the label management server 3, the front-end app 37 determines that the user can be identified (alt: identifiable). In this case, in E31 the front-end app 37 issues a related label data transmission request to the back-end app 38 to transmit related label data related to the identified Recommendation Requesting User C. The request has the user ID of Recommendation Requesting User C added thereto.

In E32 the back-end app 38 calls the label database 6 and extracts submitted label data for which the user ID of Proposal Requesting User C is recorded in the corresponding user ID (Creator User) field 62, treating as the related label data. In E33 the back-end app 38 returns a response to the front-end app 37 containing all sets of the extracted related label data. When the back-end app 38 is unable to extract any related label data, the back-end app 38 returns an empty response to the front-end app 37.

Upon receiving the response, in E41 the front-end app 37 executes a language determination process. In the language determination process of the present embodiment, the front-end app 37 determines a language based on text objects contained in the related label data. The process of E31 through E33 and E41 is an example of the determination process of the present disclosure.

Next, the language determination process will be described in detail with reference to FIG. 10. In S1 of FIG. 10, the CPU 31 of the label management server 3 determines whether any related label data has been retrieved. When the response received by the front-end app 37 from the back-end app 38 contains related label data, the CPU 31 determines that related label data has been retrieved (S1: YES).

In S2 the CPU 31 analyzes the retrieved related label data and extracts related label data containing text objects. In S3 the CPU 31 determines whether related label data containing text objects has been successfully extracted.

The CPU 31 determines that extraction has been successfully made when related label data containing text objects could be extracted in S2 (S3: YES). In S4 the CPU 31 limits the determination targets to related label data submitted within a predetermined time period from among the extracted related label data. In other words, in S4 the CPU 31 selects related label data submitted within a predetermined time period from among the extracted related label data as the determination targets. For example, the CPU 31 limits the determination targets to related label data that has been submitted within one year from the present date based on the submission dates contained in the extracted related label data.

Note that criteria other than a predetermined time period may be used as the method of limiting the determination targets in the process of S4. For example, the web app 36 may limit the determination targets to a predetermined number of sets of related label data in order of recordation in the label database 6, starting from a set of label data most recently recorded in the label database 6, based on the submission dates contained in the extracted related label data. In other words, the web app 36 may select a predetermined number of sets of related label data in order of recordation in the label database 6, starting from a set of label data most recently recorded in the label database 6, as the determination targets.

By limiting what related label data will be targets of the following determination according to a predetermined time period or predetermined number in this way, the front-end app 37 can reduce the time required for the web app 36 to make a determination. Furthermore, the language used in related label data registered (recorded) a long time ago may differ from the language currently used by the user. For this reason, the web app 36 can increase the possibility of suggesting fonts suited to the current usage of Recommendation Requesting User C by limiting the determination targets to recently registered related label data based on a predetermined time period or predetermined number.

Subsequently, in S5 the CPU 31 determines whether any of the related label data remains as a determination target. For example, when some or all of the extracted related label data was submitted during the predetermined time period, the number of sets of related label data remaining after the limitation in S4 will not be zero. In this case, the CPU 31 determines that related label data remains as a determination target (S5: YES) and advances to S6.

In S6 the CPU 31 determines the language used by Recommendation Requesting User C based on text objects contained in each remaining set of related label data set as a determination target.

For example, the CPU 31 determines the language used in the text of submitted label data based on the character codes of characters and symbols contained in the text objects of the determination targets.

As a specific example, when the related label data contains Chinese characters, the CPU 31 cannot determine whether the text is Chinese or Japanese based solely on the Chinese characters. Therefore, when the character codes of characters and symbols contained in the text objects of the determination target are UTF-8, for example, the CPU 31 obtains the code point within the Basic Multilingual Plane (BMP) for each character in the text one character at a time to determine the language used in the related label data. When the obtained characters include hiragana or katakana, for example, the CPU 31 determines that the language used in the related label data is Japanese. On the other hand, when the obtained characters include Hangul, the CPU 31 determines that the language used in the related label data is Korean. Furthermore, when the obtained characters do not include hiragana, katakana, or Hangul, the CPU 31 determines that the language used in the related label data is Chinese.

When the character codes of characters and symbols contained in the text objects of the determination targets are not UTF-8, for example, the CPU 31 may determine the language used in the related label data based on the character codes specified in XML. In this case, when the character codes are Shift-JIS, for example, the CPU 31 determines that the language used in the related label data is Japanese. When the character codes are GB 13030, for example, the CPU 31 determines that the language used in the related label data is Chinese.

The CPU 31 may also perform dictionary searches or AI-based judgments using words in the text contained in the related label data to determine what language is most likely to be the language used in the related label data.

As another example, the CPU 31 may reference the font database 7 and deduce the corresponding language from the font ID set as a font attribute in the text objects contained in the related label data.

Specifically, when the supported languages field 76 in the font database 7, associated with the font ID set in the related label data, records therein only one specific language, the fonts of the text objects contained in the related label data correspond only to that specific language. Therefore, when the supported languages field 76 records therein only one specific language, the CPU 31 may determine that that specific language is the language used in the related label data.

As another example, when the text contained in the related label data is configured only of alphabetic characters having no accents, the CPU 31 may determine that the language used in the related label data is English. Alternatively, when there are characters in the text that are only used in a specific language, such as characters with the German umlaut, the CPU 31 may determine that this specific language is the language used in the related label data.

Figure 10:
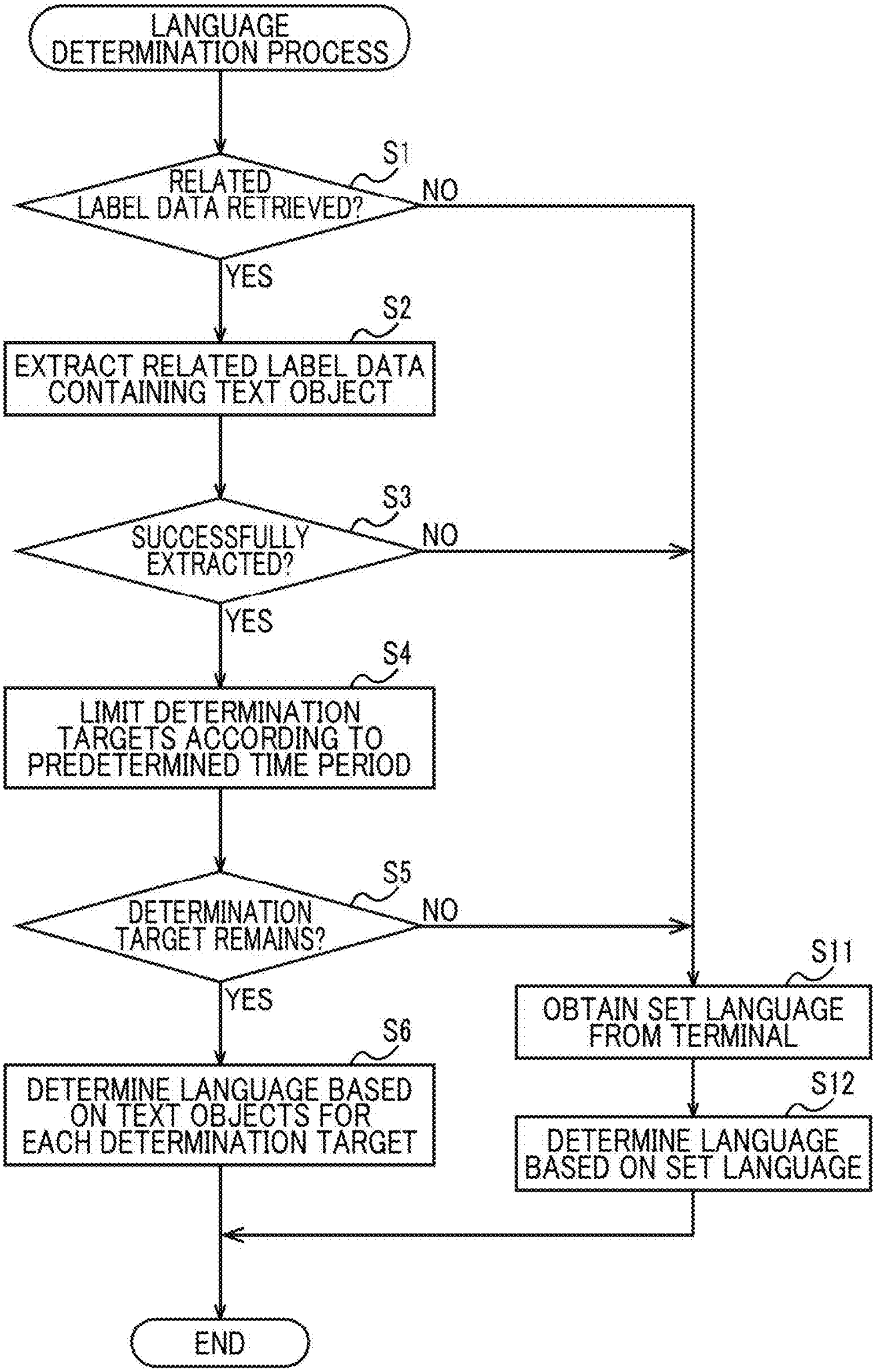
FIG. 10 is a flowchart illustrating an example of steps in a language determination process executed in the label data sharing system.

Once the CPU 31 has determined the language for all determination targets in S6 of FIG. 10, the CPU 31 ends the language determination process.

When the CPU 31 detects more than one language in S6, the CPU 31 may include all languages in the determination results or may include just one of the languages in the determination results. For example, the CPU 31 may include the language used in the greatest number of sets of related label data in the determination results. By identifying just one language when a plurality of languages has been detected, the web app 36 can limit the suggestion targets to fonts supporting the identified language, thereby simplifying the suggestions of fonts suitable for the identified user.

When no related label data is included in the response received from the back-end app 38, on the other hand, the CPU 31 determines that related label data has not been retrieved (S1: NO). Furthermore, when the response from the back-end app 38 includes related label data but none of the related label data contains text objects, the CPU 31 determines that suitable related label data has not been extracted successfully (S3: NO). Furthermore, when related label data containing text objects has been successfully extracted but none of the extracted related label data has been submitted within the predetermined time period, the CPU 31 determines that the number of sets of related label data after being limited in S4 is zero. In this case, the CPU 31 determines that the limitation in S4 left no related label data as a determination target (S5: NO).

In each of these cases, in S11 the CPU 31 obtains the language set in the terminal 1C (hereinafter called the "set language") from the terminal 1C, which is the source of the font suggestion request. Specifically, the CPU 31 queries the terminal 1C via the communication interface 34 for the set language. The terminal 1C returns the set language set in the OS 21C to the label management server 3 in response. Upon receiving this response via the communication interface 34, the CPU 31 can obtain the set language set on the terminal 1C.

In S12 the label management server 3 determines the language based on the obtained set language. For example, the CPU 31 determines that the language used in the label data is the set language obtained from the terminal 1C. Subsequently, the CPU 31 ends the language determination process.

Returning to FIG. 9, in E51 the front-end app 37 having completed the language determination process of E41 issues a recommended fonts list transmission request to the back-end app 38 to transmit a recommended fonts list. The request has the languages determined in E41 added thereto.

In E52 the back-end app 38 generates a recommended fonts list based on the languages added to the request.

When only one language is added to the request, for example, the back-end app 38 calls the font database 7 and reads font data supporting the language added to the request. In other words, the back-end app 38 extracts font data supporting the language added to the request from among the font data recorded in the font database 7. The back-end app 38 then generates a recommended fonts list based on the font data read from the font database 7. As an example, the back-end app 38 generates a recommended fonts list including sample images of the fonts represented by the extracted font data, the font names, the supported languages, the compiled character sets, introductory text, and the name or designation of the designer.

When the request has multiple languages added thereto, on the other hand, the back-end app 38 reads font data supporting each language from the font database 7 to generate a recommended fonts list. In other words, the back-end app 38 extracts font data supporting each language from the font database 7 to generate a recommended fonts list.

In E53 the back-end app 38 transfers the recommended fonts list generated in E52 to the front-end app 37.

In E54 the front-end app 37 excludes fonts corresponding to font data already downloaded by Recommendation Requesting User C from the recommended fonts list received from the back-end app 38. For example, the front-end app 37 calls the user database 5 and reads font IDs from the purchase information field 56 associated with the user ID of Recommendation Requesting User C recorded in the user ID field 51. The front-end app 37 then excludes fonts corresponding to font data associated with font IDs read from the purchase information field 56 from the recommended fonts list, thereby excluding fonts corresponding to already downloaded font data from the suggestion targets.

In E55 the front-end app 37 rearranges the fonts contained in the recommended fonts list in order of priority for display. In other words, in E55 the front-end app 47 sorts the fonts contained in the recommended fonts list by priority for display. The order of priority for display may be set based on the most recent recordation dates in the font database 7, the greatest number of compiled characters in the font data, their popularity, or alphabetic order.

When a plurality of languages has been determined in the language determination process, for example, the front-end app 37 may give font data that supports all languages a higher priority than font data that supports only some languages so that the font corresponding to the font data supporting all languages is displayed higher than the font corresponding to the font data supporting only some languages.

In addition to a method of sorting all determination targets, the method of rearranging may involve leaving fonts corresponding to font data with a high priority in the recommended fonts list while excluding fonts corresponding to font data with a low priority. As a specific example, when multiple languages have been determined in the language determination process, the front-end app 37 may leave those fonts supporting all languages in the recommended fonts list while excluding fonts supporting only some languages, thereby facilitating the web app 36 in suggesting fonts more suitable for Recommendation Requesting User C.

As another example, the order of priority may be set such that the font corresponding to font data containing characters used in submitted label data submitted by Recommendation Requesting User C may be higher than fonts corresponding to font data not containing such characters. Specifically, when Recommendation Requesting User C has submitted label data that uses JIS level 2 kanji, the font corresponding to font data that does not use JIS level 2 kanji may be excluded from the recommended fonts list.

In E56 the front-end app 37 includes the recommended fonts list edited in E55 and the languages determined in E41 in a web page and transmits this web page to the terminal 1C, which is the source of the font suggestion request. In other words, the front-end app 37 transmits the web page for suggesting the recommended fonts to the terminal 1C. In E57 the terminal 1C displays this web page on the browser 45C. Note that if in E54 and E55 the front-end app 37 has not edited the recommended fonts list received from the back-end app 38, the front-end app 37 may include the unaltered recommended fonts list in the web page as is.

After the Suggest Fonts button 330 has been operated, the terminal 1C displays a recommended fonts list screen 400, as illustrated in the example of FIG. 6B. The recommended fonts list screen 400 includes a sample image displaying region 401 for displaying a sample image and a font name displaying region 402 for displaying a font name for each font. The recommended fonts list screen 400 also includes a supported language displaying region 404 for displaying a supported language based on the determined languages for each font. Each font is displayed in order of priority. Accordingly, the web app 36 can display fonts most likely to be used by Recommendation Requesting User C on the terminal 1C in response to the font suggestion request, increasing the possibility that Recommendation Requesting User C can select a font suited to the language being used. The process of E51 through E56 is an example of the suggestion process of the present disclosure. The process of E56 is an example of the notification process of the present disclosure.

When the web app 36 receives a view request while font data corresponding to one of the fonts displayed in the recommended fonts list screen 400 is selected, the web app 36 transmits content information for the specified font data to the terminal 1C, enabling the terminal 1C to display the content information on the display 13*a*C. Furthermore, when the web app 36 receives a designation for font data to be downloaded and a download request, the web app 36 can transmit the designated font data to the terminal 1C. Since these processes are identical to those in B61 through B63 and B71 through B76 of FIG. 8, a description of the processes has been omitted here.

Note that when setting fonts in the editing screen, the printing app 46 may include fonts corresponding to font data downloaded to the terminal 1C in the fonts list. When a notification has been received from the web app 36 indicating the languages determined in the language determination process, the printing app 46C may open label data containing fonts supporting the languages in the notification and set these fonts so that downloaded font data is given priority in the displayed font list over other font data.

As described above, the web app 36 according to the first embodiment determines languages based on text objects contained in related label data related to the logged-in user from among the label data recorded in the label database 6. The web app 36 suggests font data supporting the determined languages from among the font data recorded in the font database 7. This can facilitate the web app 36 in suggesting fonts suitable for the logged-in user.

It is assumed that users in Japan, for example, will use a Japanese-language printing app 46 to create labels in Japanese. Therefore, when the label management server 3 receives a view request from the terminal 1 to view fonts stored on the label management server 3, the label management server 3 may give priority to suggesting Japanese fonts that include kanji, hiragana, and katakana. However, users in Japan these days have increasing opportunities to create labels with a mixture of Japanese and other languages to support inbound tourism. Therefore, it can be assumed that users are creating labels with Japanese fonts and fonts of other languages while using a Japanese-language printing app 46. In such cases, suggesting fonts that can support Japanese and other languages would be desirable.

By determining languages based on text objects contained in submitted label data submitted by the logged-in user, the web app 36 according to the first embodiment can determine what languages the logged-in user is likely to use for creating labels and can suggest fonts supporting those languages. In other words, when a logged-in user in Japan creates labels with a mixture of Japanese and Korean, the web app 36 can give priority to suggesting fonts supporting both Japanese and Korean over fonts that support only one of Japanese and Korean.

Moreover, languages used in submitted label data are more likely to be used for creating labels thereafter and tend to have high utility value for the user. Hence, by determining languages based on text objects contained in label data submitted by the logged-in user, the web app 36 of the first embodiment increases the possibility of suggesting fonts for languages suitable for that user.

Second Embodiment

Figure 11:
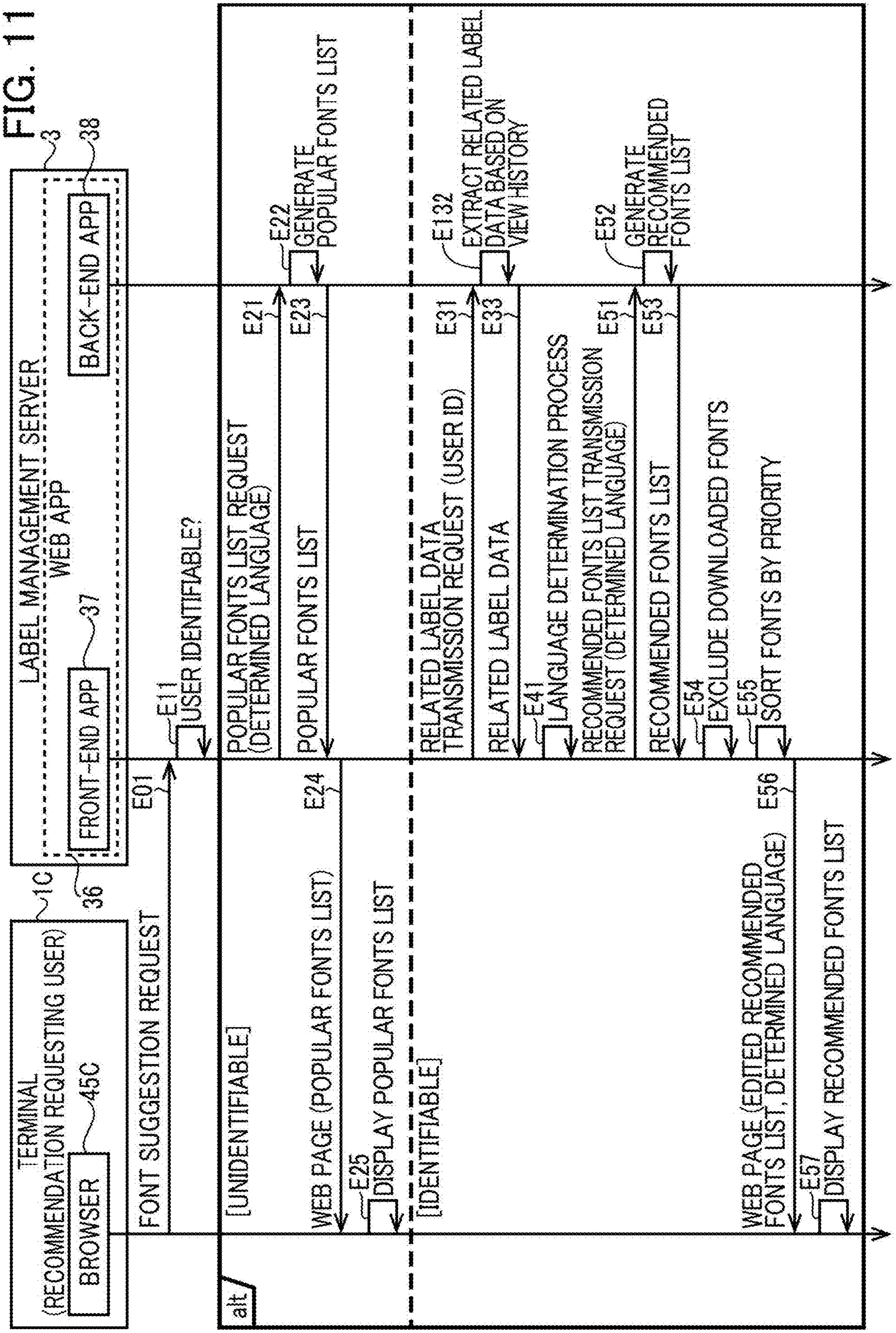
FIG. 11 is a sequence diagram illustrating another example of steps in the recommended fonts suggestion process executed in the label data sharing system.

Next, a set of computer-readable instructions according to a second embodiment of the present disclosure will be described while referring to the accompanying drawings. As shown in FIG. 11, the set of computer-readable instructions in the second embodiment determines languages based on the user's view history. This method differs from the first embodiment in which languages are determined based on the user's submission history. The following description focuses on points of difference from the first embodiment. Configurations and process steps common to those in the first embodiment are designated with the same reference numerals and step numbers used in the first embodiment, and descriptions of these configurations and processes have been omitted as appropriate.

As shown in FIG. 11, when the back-end app 38 receives a related label data transmission request from the front-end app 37 to transmit related label data (E01, E11, alt: identifiable, E31), in E132 the back-end app 38 extracts related label data based on the user's view history. For example, the back-end app 38 identifies label IDs associated with the user ID of the identified user (the logged-in Recommendation Requesting User C in the present embodiment) from the HTTP access information. The back-end app 38 then calls the label database 6 and extracts label data associated with the identified label IDs as the related label data.

The related label data to be extracted may be all label data that Recommendation Requesting User C has viewed at least once. Alternatively, the related label data may be limited to a maximum number N of the most recently viewed label data or to label data that Recommendation Requesting User C has viewed at least M times.

In E33 the back-end app 38 transfers the extracted related label data to the front-end app 37. In the process of E41 the front-end app 37 determines languages based on the text objects contained in the related label data, which has been extracted based on the view history of Recommendation Requesting User C. The process of E41 is identical to that in the first embodiment, except that the front-end app 37 determines languages based on related label data that has been extracted according to the user's view history. The process of E31, E132, E33, and E41 is an example of the determination process of the present disclosure.

Next, the front-end app 37 displays the list of fonts corresponding to the font data supporting the determined languages on the terminal 1C, which is the source of the font suggestion request (E51 through E57). The process of E51 through E57 is an example of the suggestion process of the present disclosure.

Languages used in viewed label data are more likely to be used for creating labels thereafter and tend to have high utility value for the user. In the second embodiment, the web app 36 determines languages based on the text objects contained in label data viewed by Recommendation Requesting User C, who is the logged-in user. Therefore, the web app 36 in the second embodiment increases the possibility of suggesting fonts for languages more suitable for Recommendation Requesting User C.

When the front-end app 37 of the web app 36 executes the language determination process of E41 illustrated in detail in FIG. 10, in S4 the front-end app 37 causes the CPU 31 of the label management server 3 to limit the determination targets to only related label data received from the back-end app 38 that Recommendation Requesting User C has designated in a view request within the predetermined time period. When any determination targets remain after being limited in S4 (S5: YES), in S6 the front-end app 37 determines the languages based on the remaining determination targets.

Note that in S4 the front-end app 37 may cause the CPU 31 to limit the determination targets to only a predetermined number of sets of related label data received from the back-end app 38. Specifically, the CPU 31 may limit the determination targets to a predetermined number of related label data designated in the most recent view requests issued by Recommendation Requesting User C. In other words, the CPU 31 may select a predetermined number of related label data designated in the most recent view requests issued by Recommendation Requesting User C as the determination targets. When any determination targets remain after this limitation (S5: YES), in S6 the front-end app 37 may determine languages based on the remaining determination targets. The front-end app 37 may also limit the predetermined time period or predetermined number of determination targets based on the HTTP access information, for example. In other words, the front-end app 37 may also select the predetermined time period or predetermined number of determination targets based on the HTTP access information, for example.

By having the front-end app 37 limit the determination targets to related label data that has been viewed within a predetermined time period or to a predetermined number of sets of related label data in order of most recently viewed, the web app 36 can reduce the determination time. Furthermore, the languages used in related label data having older view dates may differ from the languages currently used by Recommendation Requesting User C. For this reason, the web app 36 can increase the possibility of suggesting fonts suited to the current usage of Recommendation Requesting User C by limiting the determination targets to related label data with the most recent view dates within either a predetermined time period or a predetermined number.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The program used by terminal 1 to execute the submission process, the downloading and printing process, and the recommended fonts suggestion process may be one of the printing app 46 and browser 45.

Furthermore, the Suggest Fonts button 330 illustrated in FIGS. 6A and 6B may be eliminated. In this case, when the content display tab 322 illustrated in FIG. 6A is operated on the terminal 1, in E01 of FIGS. 9 and 11, the web app 36 may treat this operation as having received a font suggestion request and may execute the process from E11. Hence, the web app 36 displays fonts suitable for the user in response to a user operation on the content display tab 322 in the web page 300. In this way, fewer operations are required to display the recommended fonts compared to the case in which the Suggest Fonts button 330 is operated, improving user-friendliness. Alternatively, when the user using the terminal 1 performs an operation on a control element 331 illustrated in FIG. 6A for viewing all fonts, for example, in E01 of FIGS. 9 and 11 the web app 36 may treat this operation as having received a font suggestion request and may execute the process from E11. Thus, when the content display tab 322 or control element 331 serves as the Suggest Fonts button 330, the operation on the content display tab 322 or control element is an example of the font suggestion request of the present disclosure.

In the above embodiments, for example, languages are determined using one of submission history and view history. However, the web app 36 may use both submission history and view history with assigned weights. For example, submitted label data may be given higher priority than label data that has simply been viewed since the language of text contained in submitted label data is more likely to be of high utility value.

Figure 9:
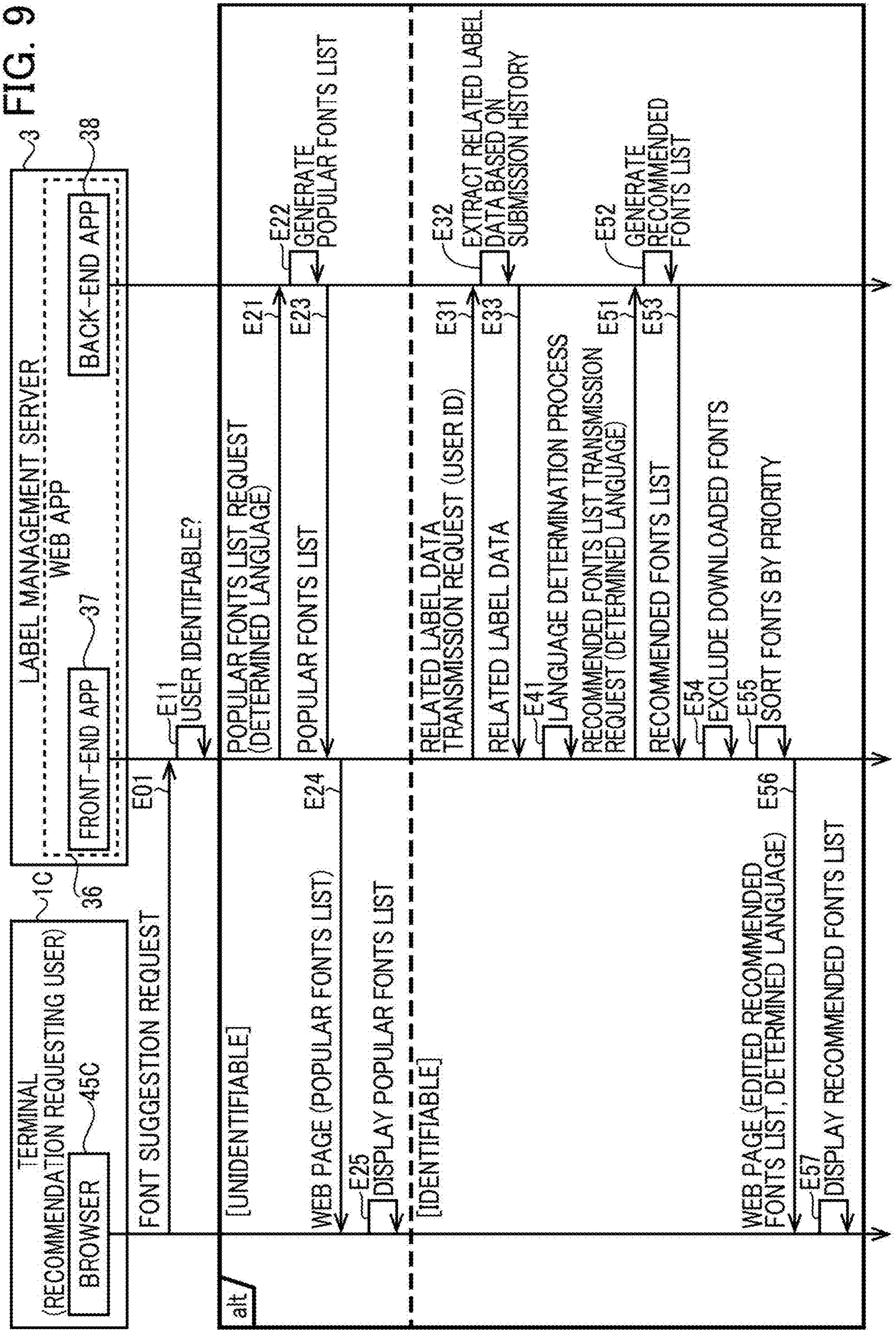
FIG. 9 is a sequence diagram illustrating an example of steps in a recommended fonts suggestion process executed in the label data sharing system.

Furthermore, S4 of FIG. 10 may be omitted and the back-end app 38 may limit the number of sets of related label data in E32 of FIG. 9 or E132 of FIG. 11. For example, the back-end app 38 may limit the number of sets of related label data based on a predetermined time period or a predetermined number in order of most recent recordation.

The label database 6 may have submitted label data with embedded user IDs recorded in the label data field 63, for example. Accordingly, in E32 of FIG. 9 the back-end app 38 can extract related label data by referencing only label data recorded in the label data field 63 in the label database 6.

As another example, the web app 36 may skip the process in S4 and S5 of FIG. 10 and may execute the process in S6 using text objects contained in all related label data as the determination targets. In this way, all submitted label data submitted by the identified user can be subjected to language determination, thereby improving determination precision.

As another example, the web app 36 may skip the process in S11 and S12 of FIG. 10. However, when none of the related label data contains text objects, the web app 36 determines the language based on the language set on the terminal 1 (in the OS 21), which is the source of the font suggestion request. Hence, even if there is no related label data containing text objects, this process increases the possibility of suggesting fonts for languages suited for the user.

As another example, the web app 36 may skip the process of E55 in FIGS. 9 and 11. However, by displaying the fonts being suggested according to order of priority for display, the web app 36 can more easily suggest fonts that are more suitable for that user.

The web app 36 may also skip the process of E54 in FIGS. 9 and 11. However, since there is no need to suggest font data that has already been downloaded, the web app 36 excludes fonts corresponding to font data that has already been downloaded by the identified user from the recommended fonts list, i.e., from the suggestion targets. Thus, the web app 36 can more easily suggest fonts that are more suitable for that user.

In E56 of FIGS. 9 and 11, the front-end app 37 need not notify the terminal 1C of the determined languages and may omit the supported language displaying regions 404 in the recommended fonts list screen 400. However, notifying the user of the results of the language determination along with the font suggestions enables the user to understand which language the suggested fonts support.

In E56 of FIGS. 9 and 11, for example, the front-end app 37 may include the determined languages in a web page and transmit the web page to the terminal 1C to be displayed together in a single region rather than displaying the determined language separately for each font.

In S3 of FIG. 10, the CPU 31 may determine that related label data has successfully been extracted when the number of sets of label data containing text objects exceeds a threshold value and that the extraction has failed when the number of sets of label data containing text objects is less than or equal to the threshold value.

When Recommendation Requesting User C uses a plurality of terminals, for example, in S11 of FIG. 10 the CPU 31 may obtain the set language from each terminal and in S12 the CPU 31 may determine the language set on the greatest number of terminals as the language used by Recommendation Requesting User C.

When the language setting has been changed on the terminal 1C, for example, in S11 of FIG. 10 the CPU 31 may obtain the language setting history from the terminal 1C and may determine the language used by Recommendation Requesting User C based on set languages in the setting history. In this case, in E55 of FIGS. 9 and 11 the front-end app 37 may set the priority of font data higher in order of languages set more recently.

For example, the user database 5 may store label IDs of viewed label data and font IDs of viewed font data in association with each user ID as the user's view history. In this case, in E132 of FIG. 11 the back-end app 38 may call the user database 5, identify label IDs associated with the user ID of the identified user, and extract label data associated with the identified label IDs from the label database 6 as the related label data. The view history may be stored in association with user IDs in a separate database from the user database 5.

In any of the sequence charts disclosed in the embodiments, any of the plurality of process steps may be executed in parallel, or the order in which the process steps is performed may be modified in any way that does not produce inconsistencies in the processes.

The processes disclosed in the embodiments may be executed by a single CPU, a plurality of CPUs, an ASIC or other hardware, or a combination of these components. Furthermore, the processes disclosed in the embodiments may be achieved through a storage medium that stores the programs used to implement those processes or according to any of various other methods or formats.

What is claimed is:

1. A non-transitory computer-readable storage medium storing a set of computer-readable instructions for a server including a computer, the server being configured to access a label database and a font database, the set of computer-readable instructions, when executed by the computer, causing the server to perform:

when a download request in which a set of font data is specified from among a plurality of sets of font data recorded in the font database is received from a download requesting device:

a transmission process including:

transmitting the set of font data specified in the download request to the download requesting device; and when a font suggestion request is received from a suggestion requesting device and a user of the suggestion requesting device has been identified as a suggestion requesting user:

a determination process including:

extracting one or more related sets of label data from among a plurality of sets of label data recorded in the label database, each of the one or more related sets of label data being related to the suggestion requesting user; and determining one or more languages based on one or more text objects contained in the one or more related sets of label data; and a suggestion process including:

extracting one or more recommended sets of font data from among the plurality of sets of font data recorded in the font database, each of the one or more recommended sets of font data supporting one or more of the one or more languages determined in the determination process; and suggesting the one or more recommended sets of font data to the suggestion requesting device.

2. The non-transitory computer-readable storage medium according to claim 1, wherein the set of computer-readable instructions, when executed by the computer, causes the server to further perform:

when an upload instruction and a set of label data are received from an upload instructing device:

a recording process including:

recording the set of label data in association with user information of a user of the upload instructing device, and wherein the extracting in the determination process extracts, as the one or more related sets of label data, one or more sets of label data associated with user information of the suggestion requesting user from among the plurality of sets of label data recorded in the label database.

3. The non-transitory computer-readable storage medium according to claim 2, wherein the determination process further includes:

selecting one or more target sets of label data from among the one or more related sets of label data, each of the one or more target sets of label data being a set of label data recorded in the label database within a predetermined time period by the recording in the recording process, and wherein the determining in the determination process determines the one or more languages based on the one or more text objects contained in the one or more target sets of label data.

4. The non-transitory computer-readable storage medium according to claim 2, wherein the determination process further includes:

selecting a predetermined number of sets of label data from among the one or more related sets of label data in order of recordation in the label database starting from a set of label data most recently recorded in the label database, and wherein the determining in the determination process determines the one or more languages based on the one or more text objects contained in the predetermined number of sets of label data.

5. The non-transitory computer-readable storage medium according to claim 1, wherein the set of computer-readable instructions, when executed by the computer, causes the server to further perform:

when a view request in which a set of label data is designated from among the plurality of sets of label data recorded in the label database is received from a view requesting device:

a viewing process including:

transmitting, to the view requesting device, content information specifying a content of the set of label data designated in the view request, and wherein, as the one or more related sets of label data, the extracting in the determination process extracts, from among the plurality of sets of label data recorded in the label database, one or more sets of label data each of which has been designated in the view request from the suggestion requesting user.

6. The non-transitory computer-readable storage medium according to claim 5, wherein the determination process further includes:

selecting one or more target sets of label data from among the one or more related sets of label data, each of the one or more target sets of label data being a set of label data designated in the view request from the suggestion requesting user within a predetermined time period, and wherein the determining in the determination process determines the one or more languages based on the one or more text objects contained in the one or more target sets of label data.

7. The non-transitory computer-readable storage medium according to claim 5, wherein the determination process further includes:

selecting a predetermined number of sets of label data from among the one or more related sets of label data in order of designation starting from a set of label data designated in a most recently received view request, and wherein the determining in the determination process determines the one or more languages based on the one or more text objects contained in the predetermined number of sets of label data.

8. The non-transitory computer-readable storage medium according to claim 1, wherein when the one or more related sets of label data includes no set of label data containing a text object, the determination process includes, in place of the determining, determining a language based on a set language set in the suggestion requesting device.

9. The non-transitory computer-readable storage medium according to claim 1, wherein the suggesting in the suggestion process transmits suggestion data to the suggestion requesting device, the suggestion data being for displaying, on the suggestion requesting device, the one or more recommended sets of font data in order of priority for display.

10. The non-transitory computer-readable storage medium according to claim 1, wherein the server is configured to access a purchase database in which purchase information is recorded for each user, the purchase information specifying one or more sets of font data downloaded by the user, wherein the set of computer-readable instructions, when executed by the computer, causes the server to perform:

when the download request is received from the download requesting device and a user of the download requesting device is identified as a download requesting user: the transmission process; and an updating process including:

updating the purchase information corresponding to the download requesting user to include the set of font data transmitted in the transmission process into the one or more sets of font data specified by the purchase information, and wherein the suggestion process further includes:

excluding the one or more sets of font data specified by the purchase information corresponding to the suggestion requesting user from the one or more recommended sets of font data.

11. The non-transitory computer-readable storage medium according to claim 1, wherein when the one or more languages determined in the determination process are two or more languages, each of the one or more recommended sets of font data suggested by the suggesting in the suggestion process supports one or more of the two or more languages.

12. The non-transitory computer-readable storage medium according to claim 1, wherein when the one or more languages determined in the determination process are two or more languages, the suggesting in the suggestion process suggests the one or more recommended sets of font data while prioritizing a set of font data supporting all of the two or more languages over a set of font data supporting some of the two or more languages.

13. The non-transitory computer-readable storage medium according to claim 1, wherein when the one or more languages determined in the determination process are two or more languages:

the determination process further includes selecting a specific language from the two or more languages, each of the two or more languages having a usage number, the usage number being the number of sets of label data using the language from among the one or more related sets of label data, the specific language being a language whose usage number is greatest among the two or more languages; and the suggestion process includes, in place of the extracting, extracting, from among the plurality of sets of font data recorded in the font database, one or more sets of font data supporting the specific language as the one or more recommended sets of font data.

14. The non-transitory computer-readable storage medium according to claim 1, wherein the set of computer-readable instructions, when executed by the computer, causes the server to further perform:

when performing the suggesting in the suggestion process, a notification process including notifying the suggestion requesting device of the one or more languages determined in the determination process.

15. A server communicable with an information processing device via a network, the server being configured to access a label database and a font database, the server being configured to perform:

when a download request in which a set of font data is specified from among a plurality of sets of font data recorded in the font database is received from the information processing device:

a transmission process including:

transmitting the set of font data specified in the download request to the information processing device; and when a font suggestion request is received from the information processing device and a user of the information processing device has been identified as an identified user:

a determination process including:

extracting one or more related sets of label data from among a plurality of sets of label data recorded in the label database, each of the one or more related sets of label data being related to the identified user; and determining one or more languages based on one or more text objects contained in the one or more related sets of label data; and a suggestion process including:

extracting one or more recommended sets of font data from among the plurality of sets of font data recorded in the font database, each of the one or more recommended sets of font data supporting one or more of the one or more languages determined in the determination process; and suggesting the one or more recommended sets of font data to the information processing device.

16. A method of transmitting font data by a server, the server being configured to access a label database and a font database, the label database storing therein a plurality of sets of label data, the font database storing therein a plurality of sets of font data, the method comprising:

in a case where the server receives, from a first client device, a download request in which font data is specified:

transmitting the font data specified in the download request to the first client device; and in a case where the server receives, from a second client device, a font suggestion request and user identifying information identifying a user of the second client device:

retrieving related label data from the label database, the related label data being related to the user identified by the user identifying information received together with the font suggestion request;

determining a language based on a text object contained in the related label data;

generating a list of recommended font data selected from among the plurality of sets of font data stored in the font database, the recommended font data supporting the language determined based on the text object contained in the related label data; and transmitting the list of the recommended font data to the second client device.

17. The method according to claim 16, further comprising:

in a case where the server receives, from a third client device, an upload instruction and label data:

storing the label data in association with user information of a user of the third client device, and wherein as the related label data, the retrieving retrieves, from among the plurality of sets of label data stored in the label database, the label data associated with user information of the user of the second client device.

18. The method according to claim 16, further comprising:

in a case where the server receives, from a third client device, a view request in which label data is designated from among the plurality of sets of label data stored in the label database:

transmitting, to the third client device, content information specifying a content of the label data designated in the view request, wherein as the related label data, the retrieving retrieves, from among the plurality of sets of label data stored in the label database, the label data designated in the view request.

19. The method according to claim 16, wherein, in a case where the related label data includes no set of label data containing a text object, the method comprises, in place of the determining, determining a language based on a set language set in the second client device.

20. The method according to claim 16, wherein the server is configured to access a purchase database, the purchase database storing therein purchase information for each user, the purchase information specifying font data downloaded by the user, wherein the method comprises:

in a case where the server receives, from the first client device, the download request and user identification information identifying a user of the first client device:

the transmitting the font data specified in the download request; and updating the purchase information corresponding to the user identified by the user identification information received together with the download request to include the font data transmitted in the transmitting into the font data specified by the purchase information, and wherein the generating includes:

excluding the font data specified by the purchase information corresponding to the user identified by the user identifying information received together with the font suggestion request from the recommended font data.

* * * * *